(12) United States Patent
Cea et al.

(10) Patent No.: US 9,094,920 B2
(45) Date of Patent: Jul. 28, 2015

(54) METHOD AND APPARATUSES FOR POWER CONTROL USING VARIABLE STEP SIZE

(75) Inventors: Mauricio Cea, Newcastle (AU);
Graham C Goodwin, Newcastle (AU);
Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 180 days.

(21) Appl. No.: 13/816,262

(22) PCT Filed: Aug. 16, 2010

(86) PCT No.: PCT/SE2010/050889
§ 371 (c)(1),
(2), (4) Date: Feb. 11, 2013

(87) PCT Pub. No.: WO2012/023885
PCT Pub. Date: Feb. 23, 2012

(65) Prior Publication Data
US 2013/0143617 A1    Jun. 6, 2013

(51) Int. Cl.
*H04W 52/24*     (2009.01)
*H04W 52/36*     (2009.01)

(52) U.S. Cl.
CPC .......... *H04W 52/241* (2013.01); *H04W 52/362* (2013.01)

(58) Field of Classification Search
CPC . H04W 52/241; H04W 52/362; H04W 52/24;
H04W 52/242; H04W 52/243; H04W 52/244;
H04W 52/245; H04W 52/246; H04W 52/247;
H04W 52/248; H04W 52/30; H04W 52/32;
H04W 52/322
USPC ........... 455/522, 69, 423, 424, 425, 512, 513,
455/446, 10, 13.4, 67.11, 67.13, 115.1,
455/135; 370/281, 328, 252, 329; 375/267
See application file for complete search history.

(56) References Cited

U.S. PATENT DOCUMENTS

| | | | |
|---|---|---|---|
| 6,445,916 B1* | 9/2002 | Rahman | 455/423 |
| 2003/0199275 A1* | 10/2003 | Sakoda et al. | 455/446 |

(Continued)

FOREIGN PATENT DOCUMENTS

| | | |
|---|---|---|
| EP | 1311076 A1 | 5/2003 |
| EP | 1796291 A1 | 6/2007 |
| WO | 2007078160 A2 | 7/2007 |

OTHER PUBLICATIONS

Khan, M. et al. "A Simple Modified Fixed Step Size Power Control Algorithm for COMA Cellular Systems." Multimedia, Signal Processing and Communication Technologies, 2009. Impact '09, Mar. 14-16, 2009, pp. 134-137, Aligarh, India.

*Primary Examiner* — Tan Trinh
(74) *Attorney, Agent, or Firm* — Murphy, Bilak & Homiller, PLLC

(57) ABSTRACT

The invention relates to a method in a radio communications network for controlling a transmission power of a user equipment (12) transmitting data to a radio base station (10) in the radio communications network. The radio base station (10) retrieves a target signal to interference ratio value and measures a signal to interference ratio of a signal transmitted with a current transmission power from the user equipment (12). The radio base station (10) then determines a user equipment capability of power control of the user equipment (12). Furthermore, the radio base station (10) computes a power control command based on the measured signal to interference ratio, the retrieved target signal to interference ratio, and the user equipment capability of power control, which power control command indicates a power control adjustment step of the user equipment (12). The radio base station (10) then transmits the power control command to the user equipment (12). The user equipment (12) calculates a transmission power step based on said received power control command and adjusts the transmission power by applying the calculated transmission power step to the current transmission power.

15 Claims, 10 Drawing Sheets

(56) References Cited

U.S. PATENT DOCUMENTS

| | | |
|---|---|---|
| 2006/0002338 A1* | 1/2006 | Guo .............................. 370/328 |
| 2009/0245409 A1* | 10/2009 | Kandukuri Narayan et al. ............................ 375/267 |
| 2010/0111027 A1* | 5/2010 | Hart .............................. 370/329 |
| 2012/0147795 A1* | 6/2012 | Narayan et al. ............... 370/281 |
| 2013/0070624 A1* | 3/2013 | Nguyen et al. ................ 370/252 |
| 2013/0301533 A1* | 11/2013 | Oteri et al. .................... 370/328 |

* cited by examiner

METHOD AND APPARATUSES FOR POWER CONTROL USING VARIABLE STEP SIZE

TECHNICAL FIELD

The present invention relates to a method in a radio base station, a radio base station, a method in a user equipment, a user equipment, a method in a controller node, a controller node, and a method in a radio communications network. In particular, embodiments herein relate to control of a transmission power of the user equipment.

BACKGROUND

In radio communications networks a user equipment is communicating via a radio base station by transmitting data to the radio base station. The data is transmitted using a transmission power. Power control in these radio communications networks has fast closed loop, also known as fast inner power control loop, and open loop power control procedures to control the transmission power of the user equipment within a radio communications network. In the fast inner power control loop in an uplink transmission towards the radio base station of code division multiple access (CDMA) systems, in particular in Wideband Code Division Multiple Access (WCDMA) systems, each user equipment transmits a signal spread in the same frequency band. Signals spread in the same frequency band causes interference for the other user equipments transmitting in the same frequency band. The consequence of the interference is that the powers of all user equipments become coupled in the uplink of CDMA cells. Consequently, if minimum possible transmission powers are used from the user equipments the co channel interference is minimized.

The services carried over these systems typically require a certain Signal to Interference Ratio (SIR), to maintain a stipulated quality of service (QoS), a QoS goal. A fast inner power control loop therefore strives to maintain a target SIR, in order to secure the above QoS goal. The target SIR is set by an outer power control loop that uses the observed block error rate for adjustment, which is much slower than the fast inner power control loop. The target SIR may also be adapted in response to so called Hybrid Automatic Repeat Request (HARQ) retransmissions in future releases of WCDMA.

The performance of the fast inner power control loop is impaired by the fact that control commands sent to the user equipment are quantized with only one bit, signaling a command to increase or decrease the user equipment transmit power in steps of typically 1 dB. There are two main problems associated with using only one bit. First, in case of a large commanded change of signal to interference ratio (SIR) from the outer power control loop, the response of the inner loop may require many power steps and consequently a substantial time before the power settles at the new power level. This problem is amplified by the nonlinear coupling between the inner loop power control loops of user equipments. Secondly, during periods of constant power, the 1 dB quantization makes the user equipment transmit power to perform an oscillation, a limit cycle, with the power commands switching between +1 dB and −1 dB constantly as there is no way to signal that the transmission power should be constant. This increases the variance of the SIR. The increased variance, in turn, requires a slightly ½ dB increased SIR target set point, in order not to end up below the service requirements.

SUMMARY

An object of embodiments herein is to provide a mechanism that controls the transmission power of a user equipment in an efficient manner.

According to an aspect of embodiments herein the object is achieved by providing a method in a radio communications network for controlling a transmission power of a user equipment. The user equipment is transmitting data to a radio base station in the radio communications network. The radio base station retrieves a target signal to interference ratio value and measures a signal to interference ratio value of a signal transmitted with a current transmission power from the user equipment.

The radio base station determines a user equipment capability of power control of the user equipment. The radio base station computes a power control command based on the measured signal to interference ratio value, the retrieved target signal to interference ratio value, and the user equipment capability of power control. The power control command indicates a power control adjustment step of the user equipment. The radio base station transmits the power control command to the user equipment.

The user equipment calculates a transmission power step in the user equipment based on said received power control command. Furthermore, the user equipment adjusts the transmission power of the user equipment by applying the calculated transmission power step to the current transmission power.

According to a second aspect of embodiments herein the object is achieved by providing a method in a radio base station for controlling transmission power of a user equipment transmitting data to the radio base station in a radio communications network. The radio base station retrieves a target signal to interference ratio value and measures a signal to interference ratio value of a received signal transmitted from the user equipment. The radio base station determines a user equipment capability of power control of the user equipment. Further, the radio base station computes a power control command based on the measured signal to interference ratio value, the retrieved target signal to interference ratio value and the user equipment capability of power control, which power control command indicates a power control adjustment step of the user equipment. The radio base station then transmits the power control command to the user equipment.

In order to perform the method a radio base station is provided. The radio base station is for controlling transmission power of the user equipment transmitting data to the radio base station in the radio communications network. The radio base station comprises a retrieving circuit configured to retrieve a target signal to interference ratio value. The radio base station further comprises a measuring circuit configured to measure a signal to interference ratio value of a received signal transmitted from the user equipment. In addition, the radio base station comprises a determining circuit configured to determine a user equipment capability of power control of the user equipment. The radio base station comprises a computing circuit configured to compute a power control command based on the measured signal to interference ratio, the retrieved target signal to interference ratio value and the user equipment capability of power control. The power control command indicates a power control adjustment step of the user equipment. The radio base station also comprises a transmitting circuit configured to transmit the power control command to the user equipment.

According to a third aspect of embodiments herein the object is achieved by providing a method in a user equipment. The method is for enabling control of a transmission power of the user equipment transmitting data to the radio base station in the radio communications network. The user equipment transmits a signal to the radio base station with a current transmission power. Additionally, the user equipment signals to the radio base station or a controller node within the radio communications network an indication of the user equipment capability of power control of the user equipment.

In order to perform the method a user equipment is provided. The user equipment is for enabling control of the transmission power of the user equipment transmitting data to the radio base station in the radio communications network. The user equipment comprises a transmitting circuit configured to transmit the signal to the radio base station with the current transmission power. Also, the user equipment comprises a signalling circuit configured to signal to the radio base station or the controller node within the radio communications network the indication of the user equipment capability of power control of the user equipment.

According to a fourth aspect of embodiments herein the object is achieved by providing a method in a controller node. The method enables control of a transmission power of a user equipment when the user equipment transmits data to a radio base station in a radio communications network. The controller node receives an indication of a user equipment capability of power control of the user equipment from the user equipment. The controller node also signals to the radio base station within the radio communications network an indication of the user equipment capability of power control of the user equipment.

In order to perform the method a controller node is provided. The controller node is for enabling control of the transmission power of the user equipment transmitting data to the radio base station in the radio communications network. The controller node comprises a receiving circuit configured to receive an indication of the user equipment capability of power control of the user equipment from the user equipment.

Furthermore, the controller node comprises a signalling circuit configured to signal to the radio base station within the radio communications network an indication of the user equipment capability of power control of the user equipment.

By implementing a mechanism into the radio communications network wherein the radio base station takes the user equipment capability of power control into account when computing power control command an efficient power control procedure is achieved the time to settle the transmission power is reduced and the variance is reduced.

BRIEF DESCRIPTION OF THE DRAWINGS

Embodiments will now be described in more detail in relation to the enclosed drawings, in which: Fill in.

DETAILED DESCRIPTION

Figure 1:
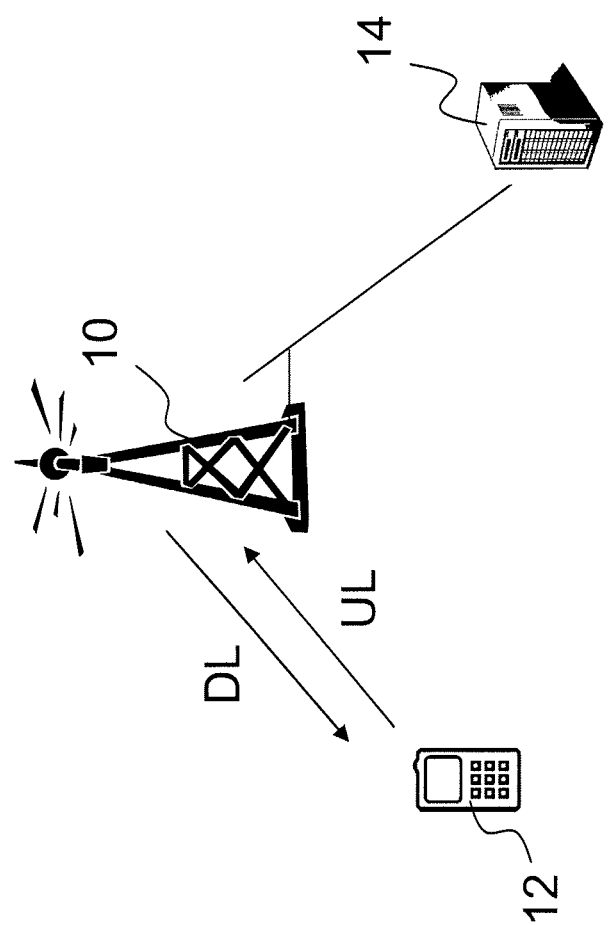
FIG. 1 is a schematic overview depicting a radio communications network.

FIG. 1 is a schematic overview depicting a radio communications network, e.g. a Long Term Evolution (LTE), LTE-Advance (Adv), 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention some few arbitrary possible options. The radio communications network comprises a radio base station (RBS) 10 serving a user equipment 12. The purpose of the illustration in FIG. 1 is to provide a general overview of the present methods and the functionalities involved herein. The radio base station 10 is transmitting data to the user equipment 12 over a downlink (DL) and the user equipment 12 is transmitting data to the radio base station 10 over an uplink (UL). The radio base station 10 may be controlled in the network by a controller node, such as a Radio Network Controller (RNC) 14.

The radio base station 10 may be referred to as e.g. a NodeB, an evolved Node B (eNB, eNode B), a base transceiver station, Access Point Base Station, base station router, or any other network unit capable to communicate with a user equipment within a cell served by the radio base station 10, depending e.g. of the radio access technology and terminology used. In the rest of the description, the term "radio base station" will be used for the radio base station 10, in order to facilitate the comprehension of the present solution.

The user equipment 12 may be represented by e.g. a wireless communication terminal, a mobile cellular phone, a Personal Digital Assistant (PDA), a wireless platform, a laptop, a computer or any other kind of device capable to communicate wirelessly with the radio base station 10.

A transmission power of the user equipment 12 to be used when transmitting to the radio base station 10 is controlled by closed loop power control, which is a combination of an inner power control loop and an outer power control loop. The RNC 14 is arranged with a radio resource management functionality comprising the outer power loop control. The inner power control loop is performed by comparing a measured SIR value to a target SIR value in the radio base station 10. The target SIR value is set and obtained in the outer power control loop according to a set Block Error Ratio (BLER) or according to Hybrid Automatic Repeat Request (HARQ) retransmissions. A BLER is defined as the ratio of the number of erroneous blocks received to the total number of blocks sent. An erroneous block is defined as a Transport Block, the cyclic redundancy check (CRC) of which is wrong. The outer power control loop is updated with a frequency of 10-100 times per second. The radio base station 10 measures a SIR value, representative of the reception quality of the transmission from the user equipment 12. The radio base station 10 compares the measured SIR value with the target SIR value. A power control command, such as a Transmit Power Control (TPC), is sent to the user equipment 12 from the radio base station 10 in order to adjust transmission power of the user equipment 12. These power control commands in the inner power control loop are transmitted 1500 times per second. A user equipment close to the radio base station 10 transmitting at the same power level as another user equipment at an edge of the cell may block out the other user equipment. To maintain reliable links to all user equipments within the cell, the received power at the radio base station 10 should be about the same. Thus, the power control tries to set the transmission power of user equipments in the cell of the radio base station 10 so that signals from different user equipments are received at a same power level at the radio base station 10.

As part of solutions of embodiments herein, the problems will be discussed. The performance of the inner loop power control is impaired by the fact that power control commands sent to the user equipment 12 are quantized with only one bit. The one bit signals a command to increase or decrease the user equipment transmit power in power control adjustment steps of 1 dB. As stated above there are two problems associated with this feature. First, in case of a large commanded change of signal to interference ratio (SIR) from the outer power control loop, the response of the inner loop may require a substantial time before the power settles at the new power level. This problem is amplified by the nonlinear coupling between the inner loop power control loops of user equipments.

Second, during periods of constant power, the 1 dB quantization makes the transmission power of the user equipment 12 to perform an oscillation, i.e. a limit cycle, with the power control commands switching between +1 dB and −1 dB constantly. This increases the variance of the SIR, and requires an additional margin of ½ dB for the SIR target.

The above two problems may be solved by providing a first mechanism residing in the user equipment 12 that increases the transmission power step of the user equipment 12, when the user equipment 12 is slewing towards a new power level, while keeping the 1 bit quantization. Thus, the new power level is reached much quicker than just using steps of ±1 dB. The mechanism may further be configured to decrease the transmission power step of the user equipment 12 when the user equipment 12 is oscillating around a specific operating point. Thus, the SIR variation is reduced even though the usage of the 1 bit quantization is kept. This first mechanism may be referred to as a zooming quantization function.

However, the advantages of this mechanism do not materialize unless the knowledge of the function of said first mechanism is utilized also when power control commands are computed in the radio base station 10. Therefore, it is herein provided according to the present solution a second mechanism residing in the radio base station 10 that account for said first mechanism in the user equipment 12 when a power control command is computed. For example, the radio base station 10 may apply a so called model predictive controller (MPC) when computing the control command taken into account that the user equipment 12 comprises the first mechanism.

In some embodiments, legacy user equipments, such as in WCDMA, will not be equipped with the first mechanism. In order to avoid that the radio base station 10 may apply said second mechanism to such legacy user equipments, which will impair performance of the radio communications network, embodiments herein discloses an information element of a user equipment capability of power control. The user equipment capability of power control indicates what kind of power control the user equipment 12 is capable of. This enhanced user equipment capability information element may be signaled from the user equipment 12 to the radio network controller (RNC) 14 over a Radio Resource Control (RRC) interface. The user equipment capability of power control information element is then signaled from the RNC 14 to the radio base station 10 over e.g. a Node-B Application Part (NBAP) signaling protocol over the network interface, for example, Iub. The NBAP signaling protocol is responsible for the control of the radio base station 10 by the RNC 14. In case the user equipment is a legacy user equipment, as indicated from the RNC 14 to the radio base station 10, the radio base station 10 applies a standard controller mechanism. For example, the standard controller mechanism may be using the transmission power step of ±1 dB. The user equipment capability of power control information element may in some embodiments be signaled directly to the radio base station 10 from the user equipment 12.

This user equipment capability of power control information element is then used in the radio base station 10 to enable the radio base station 10 to take the user equipment capability of power control into account when computing the control command.

Hence, embodiments herein disclose a mechanism that controls the transmission power of a user equipment in an efficient manner.

Figure 2:
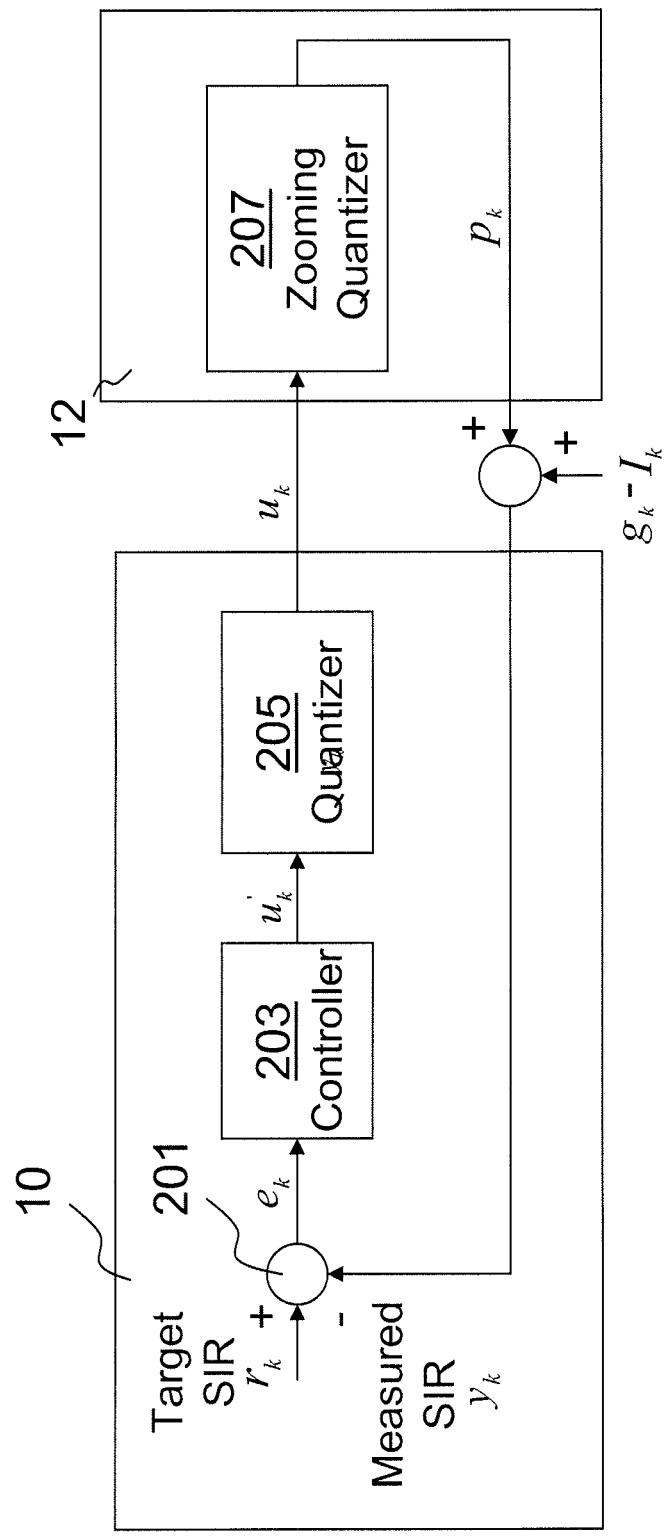
FIG. 2 is a block diagram depicting a power control process in a radio communications network

FIG. 2 is a simplified block diagram of one inner power control loop of a WCDMA uplink illustrating a power control according to some embodiments of the present solution. The radio base station 10 makes a measurement of SIR of a received signal from the user equipment 12, a measured SIR value $y_k$. The received signal is transmitted from the user equipment with a current transmission power. The measurement of SIR may be performed in every time slot of 667 ms. The radio base station 10 then compares a desired or target SIR value, $r_k$, to the measured SIR value $y_k$ in a comparing process 201. Index k is the discrete time. The target SIR value may be retrieved from the outer power control loop according to a set Block Error Ratio (BLER) or according to Hybrid Automatic Repeat Request (HARQ) retransmissions from a controller node in the network. The comparison result which is defined as a SIR error, $e_k$, is used in a controller 203. The controller 203 according to embodiments herein takes into account user equipment capability of power control of the user equipment 12 and outputs a control signal, $u'_k$. In a quantizer 205 in the radio base station 10, a one-bit quantized transmitted control signal, $u_k$, also referred to as a power control command, is generated and transmitted to the user equipment 12. Note that the quantities are expressed in a logarithmic scale of dB and that the $u_k$ is based on the $u'_k$.

The $u_k$ is received in the user equipment 12. In some embodiments the user equipment capability of power control comprises a zooming quantifier 207. The zooming quantizer 207 calculates a transmission power step based on the received $u_k$ and at least a previously received power control command $u_{k-1}$. The user equipment 12 then transmits a signal carrying data and/or reference symbols to the radio base station with an adjusted transmission power, $p_k$. The transmission power is adjusted by applying the transmission power step to the current transmission power. The transmission power $p_k$ of the signal is then exposed to an uplink channel gain $g_k$ and an interference $I_k$. The inner loop power controller operates at a frequency of 1500 Hz.

According to embodiments herein the zooming quantizer 207 is presented in the 1 bit quantization case. It should be understood that a generalization to multiple bit quantization is straightforward and embodiments herein are also applicable to the multiple bit case. Furthermore, generalizations to the use of more than two power control commands, delayed by more than one sample, is also straightforward, the use of only $u_{k-1}$ in the present description is to provide the clearest possible description of embodiments of the present solution. u(k) will be used to denote the power control command sent by the radio base station 10 to the user equipment 12 in the computation below. As stated above embodiments disclosed herein relate to a power control command of one bit, thus, $u(k) \in \{-1, 1\}$. The transmission power step used by the user equipment 12 with a zooming quantizer is denoted as $u_{ZQ}(k)$ and k is denoting discrete time.

The zooming quantizer 207 adds a dynamic finite state machine as a decoder in the user equipment 12 to interpret the signs of the incoming power control commands. In some preferred embodiments the algorithm for the zooming quantizer 207 is:

$$u_{ZQ}(k+d) = \text{sign}(u(k)) \cdot u_{ZQ}(k+d-1) \cdot b^{sign(u(k-1)sign(u(k)))} u \quad (0, \ldots, d-1) = 1 \quad (1)$$

where 'd' is the delay in the user equipment 12 and 'b' is a base used, also referred to as a zooming factor. The algorithm described by equation (1) does not necessarily involve a change in the radio base station 10 or the zooming quantizer 207 itself, but a change in the way that the 1 bit power control command u(k) is interpreted and used by the user equipment 12. Therefore, the sent power control command is still compatible with other user equipments not having this algorithm, for example, legacy user equipments. Other schemes in the same spirit are possible and may be implemented with the same algorithmic result. The algorithm result in that two consecutively received power control commands of the same sign, for example, positive power bits or negative power bits, results in an increased power step. Two consecutively received control signals of different signs, for example, positive power bit followed by a negative power bit, results in a decreased power step. This requires that b of equation (1) is greater than 1.

The main advantage of this scheme is that, if the user equipment 12 receives the same signal over an over again, it will increase the power increments thus reducing the transient time. On the other hand, if the user equipment 12 receives an alternating signal . . . +1, −1, +1, −1 . . . it will decrease its step size gradually, thus, decreasing the SIR variation. A minimum step may be set to ±0.5 dB.

Figure 3:
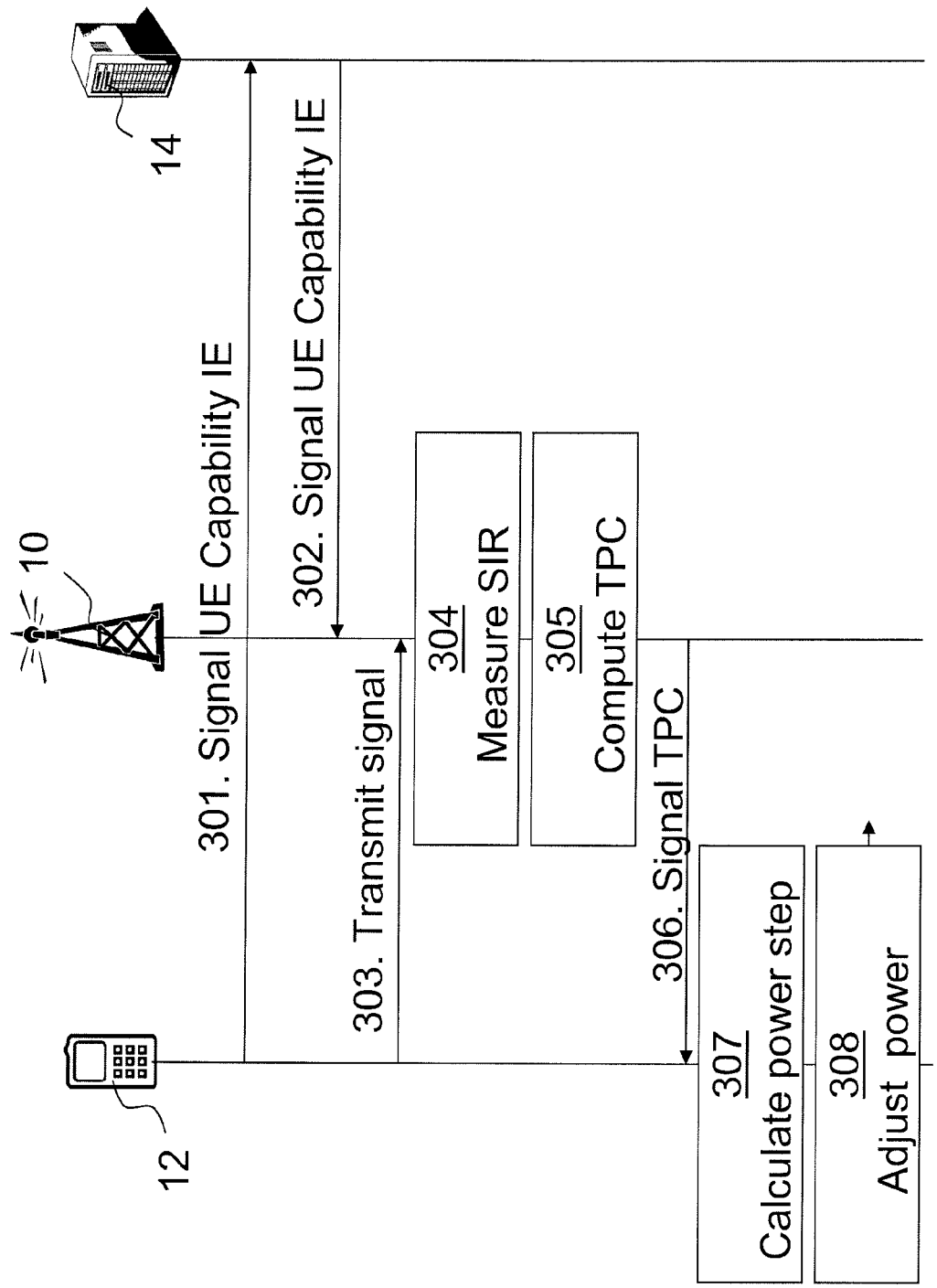
FIG. 3 is a schematic combined flow chart and signalling scheme in a radio communications network.

FIG. 3 is a schematic combined signalling scheme and flow chart depicting some embodiments of the present solution. The steps do not have to be taken in the order stated below, but may be taken in any suitable order.

Step 301. The user equipment 12 signals a user equipment capability of power control to the radio network controller 14. The user equipment capability of power control may be indicated in an information element over an RRC interface to the radio network controller 14.

The user equipment capability of power control may be signalled over the RRC interface in several ways. The user equipment capability of power control may be signalled in connection when the user equipment 12 establishes an RRC connection. For example, a subset of the user equipment capability of power control may be transmitted already in an RRC Connection Request message or the first message sent on a random access channel (RACH) of WCDMA may comprise user equipment capability of power control. A complete list of power control capabilities of the user equipment 12 may be sent in an RRC Connection Setup Complete message.

The user equipment capability of power control may further be signalled in case any user equipment capability of power control is changed during a connection. Thus, the change may trigger a transmission of a user equipment capability of power control message. The user equipment capability of power control may further be signalled in connection with a Serving Radio Network System (SRNS) Relocation or in case of handover to/from GSM or another radio communications network.

Step 302. The radio network controller 14 signals an indication of the user equipment capability of power control of the user equipment 12 to the radio base station 10. This indication may be an information element transmitted over Iub interface to the radio base station 10 or similar of different communications networks. In some embodiments, the user equipment capability of power control may be signalled from the RNC 14 to the RBS 10 over, for example, the NBAP interface. This signalling may be limited to one single bit, wherein the information element indicates implemented zooming quantization function or not.

Step 303. The user equipment 12 also transmits a signal to the radio base station 10 with a current transmission power.

Step 304. The radio base station 10 measures a signal-to-interference ratio (S/I or SIR) value, related to the carrier-to-interference ratio (C/I, CIR), of the received signal. The SIR value may be the quotient between an averaged received modulated carrier power and an averaged received co-channel interference power.

Step 305. The radio base station 10 then computes a power control command, which power control command indicates a power control adjustment step of the user equipment 12. The computation of the power control command is based on the measured signal to interference ratio value, a retrieved target signal to interference ratio value, and the user equipment capability of power control. The target signal to interference ratio value may be retrieved from a local memory, the RNC 14 or the like.

In some embodiments, a Model Predictive Control (MPC) based controller is provided to calculate the power command thereby achieving a high performance. The MPC based controller takes advantage of zooming quantization function in the user equipment 12. This MPC based controller is implemented at the radio base station 10. A rolling-horizon criterion of length N is used. A cost function, J, is chosen as a sum of the absolute errors between, a target final received power, $p_j(\infty)$, and a current received power, $p_j(i)$, from the next time step (k+1 time step) to N+d+k time step after, i.e. for user equipment 'j' it holds that:

$$J_j = \sum_{i=k+1}^{k+d+N} |p_j(\infty) - p_j(i)| \quad (2)$$

where k is the current time instant, d is the delay $p_j(i)$ is the current received power for the user equipment 12 at the radio base station 10 received at time i and $p_j(\infty)$ is the target final received power.

The received power is easily obtained, e.g. from the measured SIR. As understood other cost functions are possible as well. The rolling-horizon optimizer works as follows: The MPC based controller chooses the N step sequence to minimize the cost function (2) but it only applies the first step, e.g. the optimal control signals are solved from the criterion using standard optimization techniques. Then, the optimal sequence is recomputed based on the current measured power at the radio base station 10. MPC is a multivariable algorithm that uses an internal dynamic model of the process, a history of past transmissions power, and an optimization cost function, J, over the receding prediction horizon, to calculate the optimum power control commands.

The MPC based controller used for optimization incorporates the zooming quantization function of the user equipment 12. Note that the rolling horizon allows this sophisticated MPC based controller to work with any user equipment independent of zooming quantization function or not. It should also be noted that by configuring the radio base station 10 to take into account the user equipment capability of power control the advantage of the intelligent zooming quantization function in the user equipment is improved.

Step 306. The radio base station 10 signals the computed power control command to the user equipment 12. The power control command may be as illustrated a Transmit Power Control (TPC) command.

Step 307. The user equipment 12 receives the TPC command and calculates a transmission power step by adding or subtracting a power value to the transmission power step based on the received TPC command. If the user equipment 12 comprises a zooming quantization function, the user equipment 12 adds or subtracts the power value based on analysing the received power control command and a latest previously received power control command.

Step 308. The user equipment 12 adjusts the transmission power of the user equipment 12 by applying the calculated transmission power step to the current transmission power. Thus, the transmit power of the user equipment is adjusted to a sum of a previous transmission power and the calculated transmission power step.

Some advantages of embodiments herein include an improved power control with:

faster settling to a new target SIR value, and reduced variance with regards to the new target SIR value. The latter fact means that power control margins may be reduced with an amount similar to the reduction of the standard deviation, thereby enhancing the capacity of the system with, for example, an amount equal to 0.5 dB target SIR reduction for all user equipments.

Figure 4:
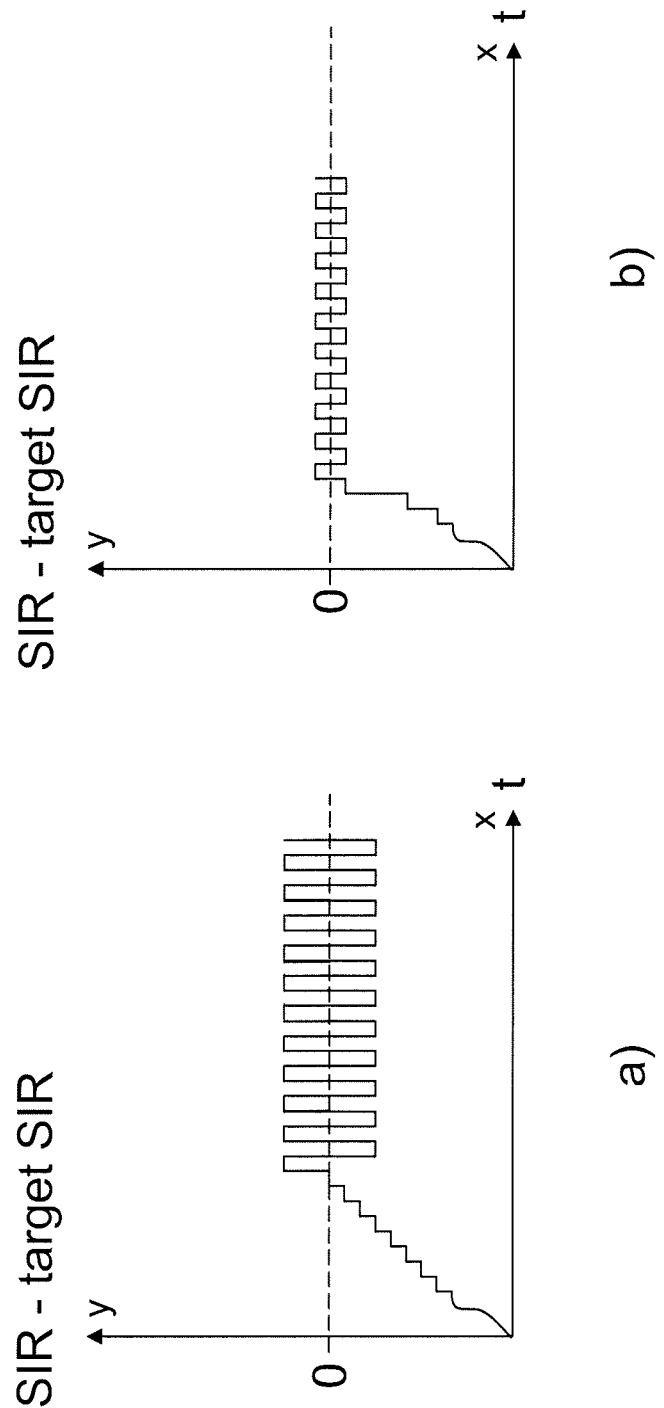
FIGS. 4a-4b are schematic graphs depicting SIR-target SIR of different power control procedures.

FIG. 4a is a schematic graph depicting obtained performance when using a current standard transmission power step solution. A measured SIR value minus target SIR value is defined along a y-axis and time t is defined along an x-axis. It is illustrated that the transient time to reach the desired equal state between measured SIR and target SIR is long. That means, that the number of steps is high to reach SIR-target SIR=0. Also illustrated is that the oscillation during reached measured SIR-target SIR resulting in a rather high variance of the SIR value.

Is should also be noted that using a zooming quantization function in the user equipment 12 and not using the user equipment capability of power control knowledge in the radio base station 10 may also cause unnecessary large power steps and oscillations.

FIG. 4b is a schematic graph depicting obtained performance when both the first control mechanism and the second control mechanism, according to embodiments herein, are used in the radio communications network. As can be seen the transient response is faster and the oscillations in steady state are significantly reduced compared to a method without knowledge of the user equipment capability of power control.

This is exemplified when the user equipment 12 increases or decreases the transmission power using the transmission power step from the zooming quantization function. The transmission power step is increased if the user equipment 12 receives two sequential power control commands of a same sign of power control from the radio base station 10 and decreased if the user equipment 12 receives two sequential power control commands of different signs of power control from the radio base station 10.

Another issue that may be addressed is saturation in the user equipment 12. Due to the capability of power control in some embodiments wherein the user equipment 12 varies the transmission power step size, an upper and lower level for the transmission power step may be defined, for example, a lower saturation limit of 0.5 dB.

Figure 5:
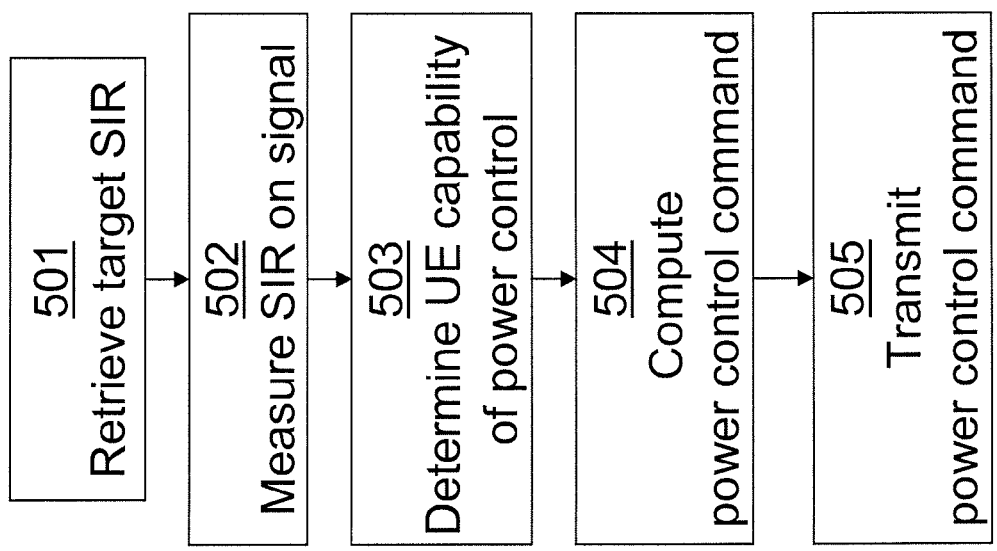
FIG. 5 is a schematic flowchart depicting a method in a radio base station in a radio communications network.

The method steps in the radio base station 10 for controlling transmission power of a user equipment 12 transmitting data to the radio base station 10 in a radio communications network according to some general embodiments will now be described with reference to a flowchart depicted in FIG. 5. The steps do not have to be taken in the order stated below, but may be taken in any suitable order.

Step 501. The radio base station 10 retrieves a target signal to interference ratio value from, for example, a controller node or stored locally.

Step 502. The radio base station 10 measures a signal to interference ratio value of a received signal from the user equipment 12. The signal has been transmitted from the user equipment 12 with a transmission power, also referred to as a current transmission power.

Step 503. The radio base station 10 determines a user equipment capability of power control of the user equipment 12. The radio base station may retrieve this from the controller node or from locally stored user equipment capabilities in a list. The user equipment capability of power control may be received as an indication from a controller node 14 or the user equipment 12.

It should be noted that the user equipment capability of power control may indicate that the user equipment 12 comprises a zooming quantization function, as described herein. The zooming quantization function is arranged to determine a transmission power step to be added or subtracted to the current transmission power of the user equipment 12. The transmission power step may be determined in the zooming quantization function based on a received power control command and at least one previously received power control command from the radio base station 10.

Step 504. The radio base station 10 computes a power control command based on the measured signal to interference ratio value, the retrieved target signal to interference ratio value and the user equipment capability of power control. For example, the radio base station 10 determines the difference between measured SIR and target SIR. Based on the difference and if the user equipment 12 has a zooming quantization function, the radio base station 10 may determine the sign of the power control command based on previously sent power control command. Thus, some embodiments incorporate the zooming quantization function when determining the power control command. The power control command indicates a power control adjustment step of the user equipment 12, for example, as a one bit information element. In some embodiments, the radio base station 10 applies a model predictive control (MPC) strategy based on a rolling horizon approach. This MPC strategy incorporates the user equipment capability of power control when computing the power control command.

In, for example, WCDMA, there will be user equipments of two kinds in the network-user equipments with an enhanced power control functionality, such as the zooming quantization function, implemented and legacy user equipments without the enhanced power control functionality. The effect of controlling a legacy user equipment with a MPC based controller, according to embodiments herein, is a slightly reduced performance. Thus, this is solved by providing a radio base station 10 that knows which type of power control the controlled user equipments is capable of. Embodiments herein therefore also handles legacy user equipments as the user equipment capability of power control is taken into account when computing the power control command.

Hence, the radio base station 10 applies the standard controller in case of a legacy user equipment and applies the zooming quantization controller of the embodiments herein when the user equipment capability of power control indicates that the user equipment has a zooming quantization controller implemented.

Step 505 The radio base station 10 transmits the power control command to the user equipment 12.

Figure 6:
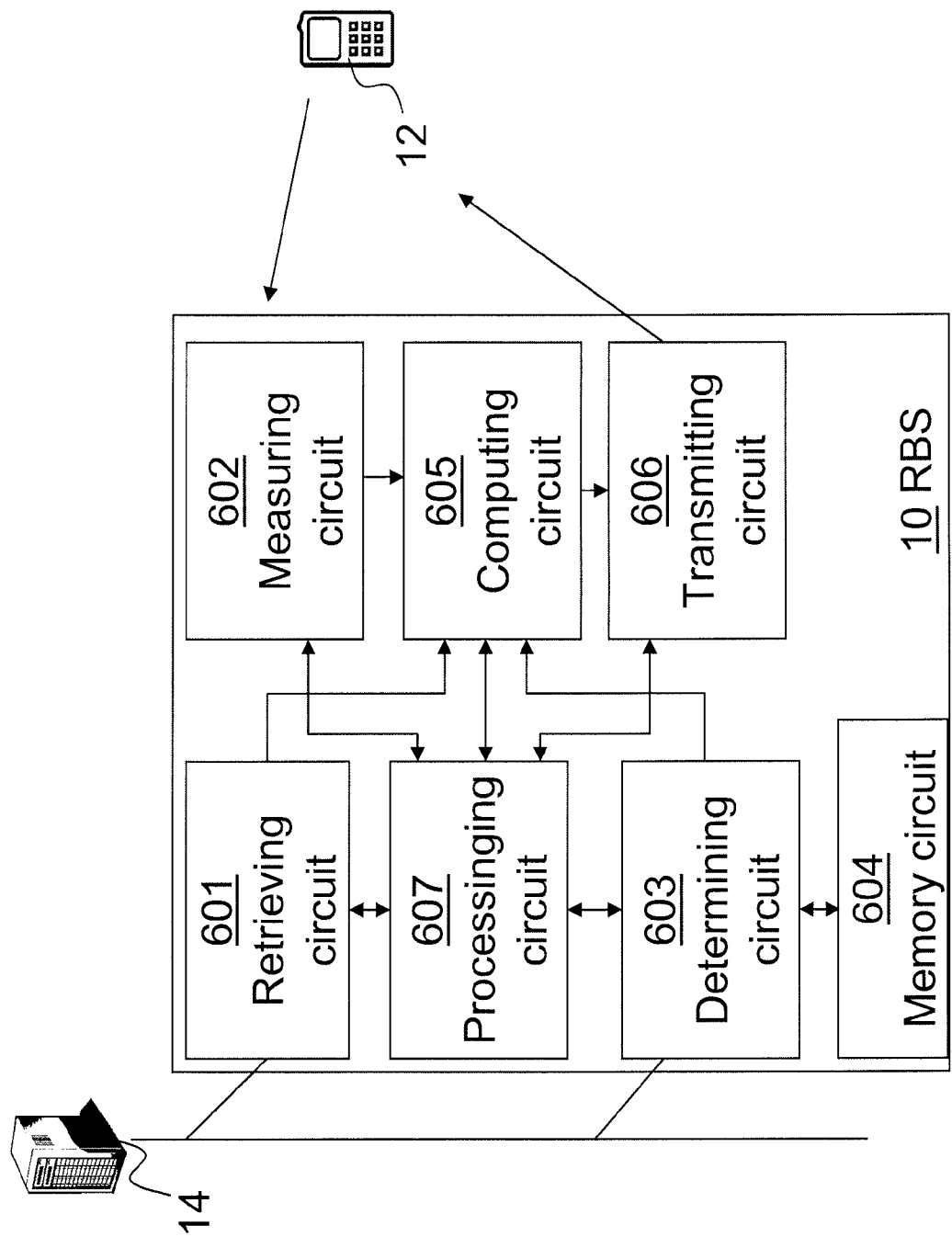
FIG. 6 is a block diagram depicting a radio base station.

In order to perform the method a radio base station is provided. FIG. 6 is a block diagram depicting the radio base station 10. The radio base station 10 is for controlling transmission power of a user equipment 12 transmitting data to the radio base station 10 in a radio communications network.

The radio base station 10 comprises a retrieving circuit 601 configured to retrieve a target signal to interference ratio value. This value may be retrieved from the RNC 14 or the like. The radio base station 10 may further comprise a measuring circuit 602 configured to measure a signal to interference ratio value of a received signal transmitted from the user equipment 12. Thus, measuring circuit 602 may comprise a receiving circuit arranged to receive the signal.

The radio base station 10 comprises a determining circuit 603 configured to determine a user equipment capability of power control of the user equipment 12. The user equipment capability of power control may be received from the RNC 14 or the user equipment 12 and stored in a memory circuit 604. Furthermore, the radio base station 10 comprise a computing circuit 605 configured to compute a power control command based on the measured signal to interference ratio value, the retrieved target signal to interference ratio value and the user equipment capability of power control. The power control command indicates a power control adjustment step of the user equipment 12. Also, the radio base station 10 comprises a transmitting circuit 606 configured to transmit the power control command to the user equipment 12.

Figure 7:
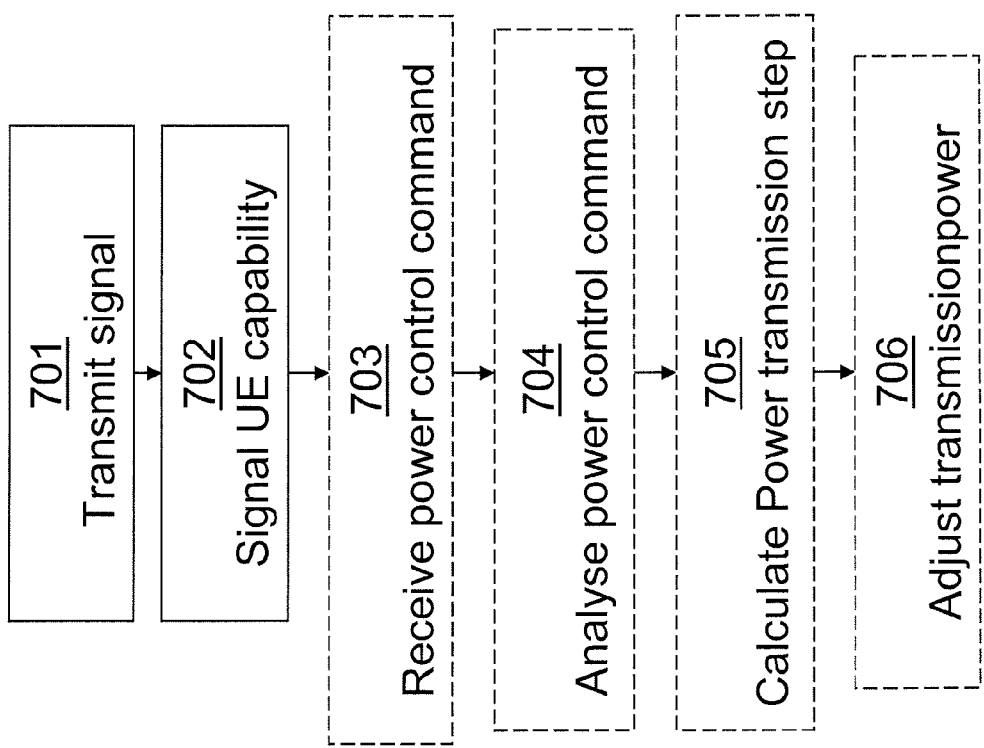
FIG. 7 is a schematic flowchart depicting a method in a user equipment in a radio communications network.

The method steps in the user equipment 12 for enabling control of a transmission power of the user equipment 12 transmitting data to a radio base station 10 in a radio communications network according to some general embodiments will now be described with reference to a flowchart depicted in FIG. 7. The steps do not have to be taken in the order stated below, but may be taken in any suitable order.

Step 701. The user equipment 12 transmits a signal to the radio base station 10 with a current transmission power.

Step 702. The user equipment 12 signals to the radio base station 10 or a controller node 14 within the radio communications network an indication of a user equipment capability of power control of the user equipment 12. Thus, the user equipment 12 enables the radio base station 10 to determine the user equipment capability of power control of the user equipment 12 either from the controller node 14 or the user equipment 12. The radio base station 10 may then compute the power control command based on the user equipment capability of power control of the user equipment 12.

A Uu interface provides interconnection between the controller node 14 and user equipment 12 via the radio base station 10. In some embodiments, the indication may be signalled to the controller node 14 over a Radio Resource Control interface via the radio base station 10.

The indication of a user equipment capability of power control of the user equipment 12 may comprise an indication of the zooming quantization function. As stated above the zooming quantization function is arranged to determine a transmission power step to be added or subtracted to a current transmission power of the user equipment 12. The transmission power step is calculated based on a received power control command and at lease one, such as the latest, previously received power control command from the radio base station 10.

The indication may be referred to as user equipment capability of power control information element. The user equipment capability of power control information element may be signalled in connection with Serving Radio Network System Relocation, intra radio access technology handover, change of capability, during random access procedure or the like.

Step 703. This is an optional step as indicated by the dashed line. In some embodiments, the user equipment 12 receives a power control command from the radio base station 10. The power control command may indicate a power control adjustment step to be added a current transmission power of the user equipment 12.

Step 704. This is an optional step as indicated by the dashed line. The user equipment 12 may then analyse the received power control command and at least one previously received power control command. This may be performed in a zooming quantizer implemented in the user equipment.

Step 705. This is an optional step as indicated by the dashed line. The user equipment 12 may then calculate a transmission power step by adding or subtracting a power value to the transmission power step based on the analysis of the received power control command.

Step 706. This is an optional step as indicated by the dashed line. The user equipment 12 may then adjust the transmission power by applying the calculated transmission power step to the current transmission power. The transmission power step may be limited by implementing a first threshold power value, wherein the transmission power step should be below the first threshold power value. The transmission power step may also be limited by implementing a second threshold power value. The second threshold power value may be set so that the transmission power step exceeds the second threshold power value.

Figure 8:
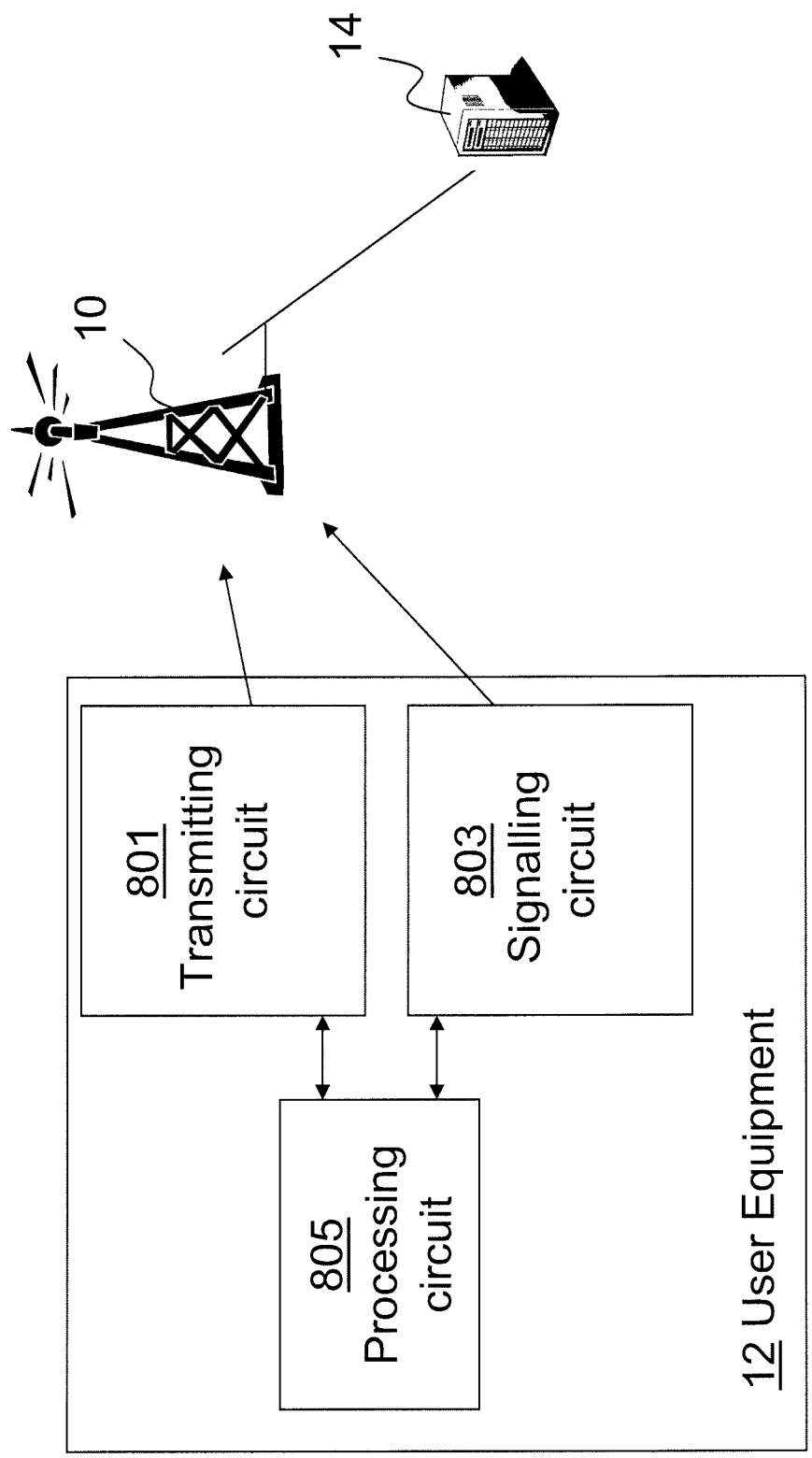
FIG. 8 is a block diagram depicting a user equipment.

In order to perform the method a user equipment is provided. FIG. 8 is a block diagram depicting the user equipment 12. The user equipment 12 enables the radio base station 10 to control of a transmission power of the user equipment 12 transmitting data to the radio base station 10 in a radio communications network. The user equipment 12 comprises a transmitting circuit 801 configured to transmit a signal to the radio base station 10 with a current transmission power. Furthermore, the user equipment 12 comprises a signalling circuit 803 configured to signal to the radio base station 10 or a controller node 14 within the radio communications network an indication of a user equipment capability of power control of the user equipment 12.

Figure 9:
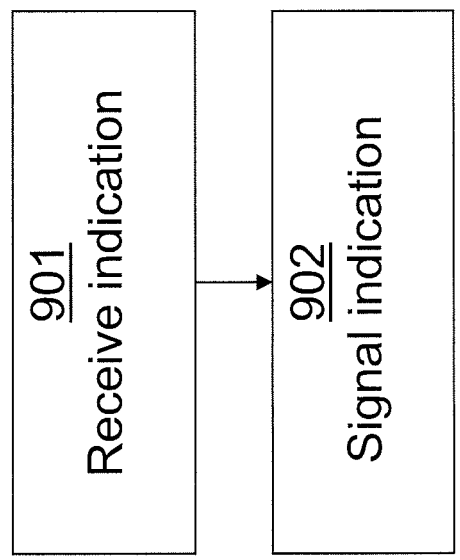
FIG. 9 is a schematic flowchart depicting a method in a controller node in a radio communications network.

The method steps in the controller node, referred to as a radio network controller 14 in some figures, for enabling control of a transmission power of a user equipment 12 transmitting data to a radio base station 10 in a radio communications network according to some general embodiments will now be described with reference to a flowchart depicted in FIG. 9. The steps do not have to be taken in the order stated below, but may be taken in any suitable order.

Step 901. The controller node 14 receives an indication of a user equipment capability of power control of the user equipment 12 from the user equipment 12.

Step 902. The controller node 14 signals to the radio base station 10 within the radio communications network an indication of the user equipment capability of power control of the user equipment 12.

As the controller node 14 signals the user equipment capability of power control of the user equipment 12 to the radio base station 10. The radio base station 10 is enabled to compute the power control command as stated above in FIG. 5.

The received indication may be the same as the signalled indication. That is, the received indication is forwarded by the controller node 14. It should also be understood that the signalled indication may be in a different message than the received indication. The indication may indicate the zooming quantization function. The zooming quantization function is arranged to determine a transmission power step to be added or subtracted to a current transmission power of the user equipment 12. The transmission power step is determined based on a received power control command and a previously received power control command from the radio base station 10.

Figure 10:
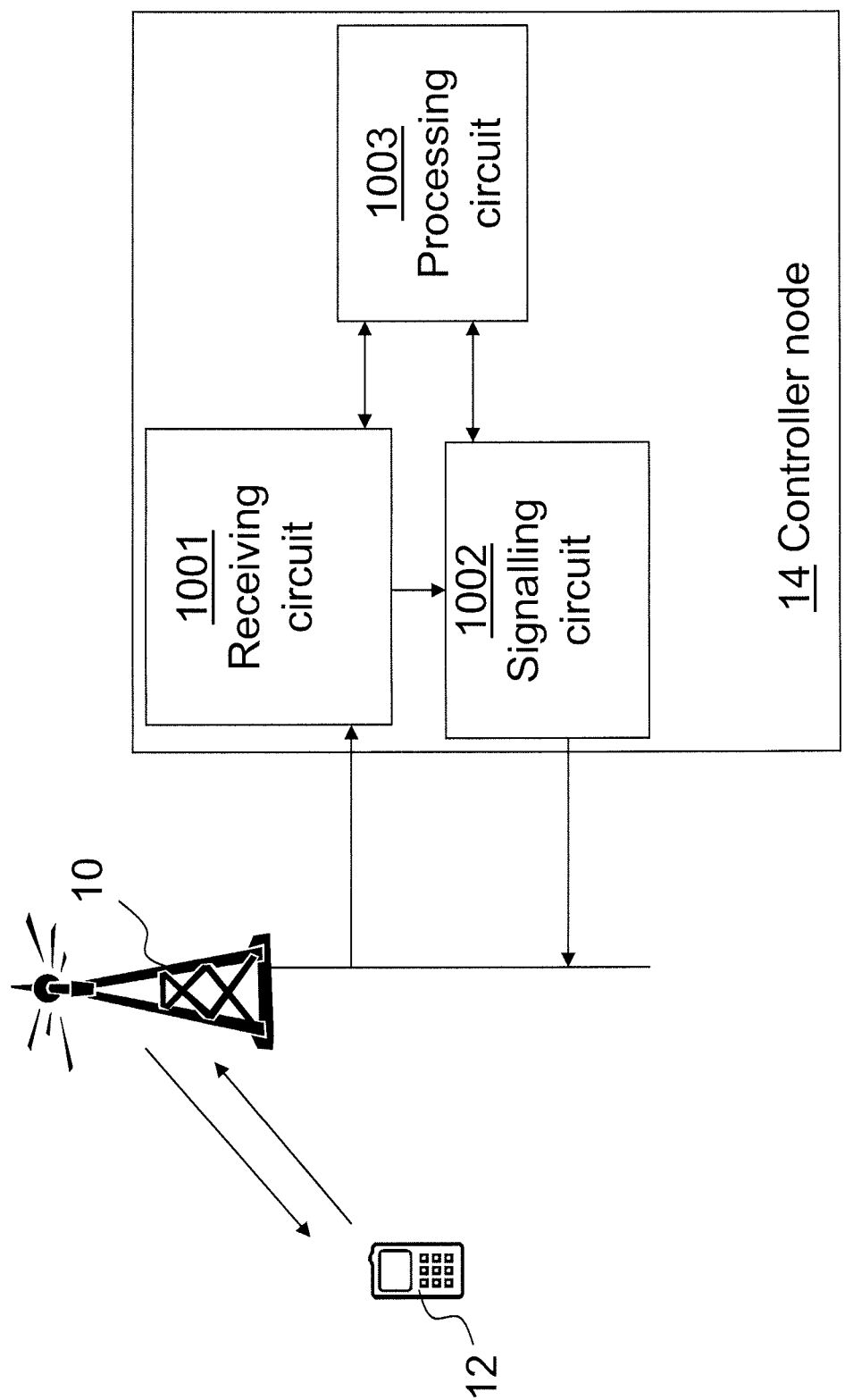
FIG. 10 is a block diagram depicting a controller node.

In order to perform the method a controller node is provided. FIG. 10 is a block diagram depicting the controller node 14. The controller node 14 is suitable for enabling control of a transmission power of a user equipment 12 transmitting data to a radio base station 10 in a radio communications network. The controller node 14 comprises a receiving circuit 1001 configured to receive an indication of a user equipment capability of power control of the user equipment 12 from the user equipment 12. Furthermore, the control node comprises a signalling circuit 1002 configured to signal to the radio base station 10 within the radio communications network an indication of the user equipment capability of power control of the user equipment 12.

The controller node 14 may be represented by a radio network controller in a WCDMA network or similar.

The present mechanism for enabling transmission power control between the user equipment 12 and the radio base station 10 may be implemented through one or more processors, such as a processing circuit 607 in the radio base station 10 depicted in FIG. 6; such as a processing circuit 805 in the user equipment 12 depicted in FIG. 8; and/or such as a processing circuit 1005 in the controller node 14 depicted in FIG. 10 together with computer program code for performing the functions of the present solution. The program code mentioned above may also be provided as a computer program product, for instance in the form of a data carrier carrying computer program code for performing the present solution when being loaded into the user equipment 12, the controller node 14 or the base station 10. One such carrier may be in the form of a CD ROM disc. It is, however, feasible with other data carriers such as a memory stick. The computer program code may furthermore be provided as pure program code on a server and downloaded to the user equipment 12, the controller node 14 or the base station 10.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio communications network for controlling a transmission power of a user equipment transmitting data to a radio base station in the radio communications network, the method comprising:

retrieving a target signal-to-interference ratio value in the radio base station;

measuring, in the radio base station, a signal-to-interference ratio value of a signal transmitted with a current transmission power from the user equipment;

determining whether the user equipment comprises a zooming quantization function;

computing a power control command based on the measured signal-to-interference ratio value, the retrieved target signal-to-interference ratio value, and whether the user equipment comprises a zooming quantization function, by applying a model predictive control strategy based on a rolling horizon approach, wherein the power control command indicates a power control adjustment step of the user equipment;

transmitting the power control command to the user equipment;

calculating a transmission power step in the user equipment based on said received power control command; and adjusting the transmission power of the user equipment by applying the calculated transmission power step to the current transmission power.

2. A method in a radio base station for controlling transmission power of a user equipment transmitting data to the radio base station in a radio communications network, the method comprising:

retrieving a target signal-to-interference ratio value;

measuring a signal-to-interference ratio value of a received signal transmitted from the user equipment;

determining whether the user equipment comprises a zooming quantization function;

computing a power control command based on the measured signal-to-interference ratio value, the retrieved target signal-to-interference ratio value and whether the user equipment comprises a zooming quantization function, by applying a model predictive control strategy based on a rolling horizon approach, wherein the power control command indicates a power control adjustment step of the user equipment; and transmitting the power control command to the user equipment.

3. The method of claim 2, wherein the determination whether the user equipment comprises a zooming quantization function is received as an indication from a controller node or the user equipment.

4. The method of claim 2, wherein the zooming quantization function is arranged to determine a transmission power step to be added or subtracted to a current transmission power of the user equipment, which transmission power step is determined based on a received power control command and at least one previously received power control command from the radio base station.

5. The method of claim 2, wherein the user equipment is determined to not comprise a zooming quantization function, which zooming quantization function is arranged to determine a transmission power step to be added or subtracted to a current transmission power of the user equipment, which transmission power step is determined based on a received power control command and at least one previously received power control command from the radio base station, and wherein the step of computing the power control command is performed according to a standard manner.

6. A method in a user equipment for enabling control of a transmission power of the user equipment transmitting data to a radio base station in a radio communications network, the method comprising:

transmitting a signal to the radio base station with a current transmission power; and signaling to the radio base station or a controller node within the radio communications network an indication of whether the user equipment comprises a zooming quantization function for handling power control commands received at the user equipment from the radio communications network.

7. The method of claim 6, wherein the zooming quantization function is arranged to determine a transmission power step to be added or subtracted to a current transmission power of the user equipment, which transmission power step is calculated based on a received power control command and at least one previously received power control command from the radio base station.

8. The method of claim 7, further comprising:
receiving a power control command from the radio base station;
analyzing the received power control command and at least one previously received power control command;
calculating a transmission power step by adding or subtracting a power value to the transmission power step based on the analyzing of the received power control command; and
adjusting the transmission power of the user equipment by applying the calculated transmission power step to the current transmission power when the transmission power step is below a first threshold power value or exceeds a second threshold value.

9. The method of claim 6, wherein the indication is signaled to the controller node over a Radio Resource Control interface via the radio base station.

10. The method of claim 6, wherein the indication is being referred to as a user equipment capability of power control information element and is signaled in connection with a Serving Radio Network System Relocation, an intra-radio-access-technology handover, a change of capability, or during a random access procedure.

11. A method in a controller node for enabling control of a transmission power of a user equipment transmitting data to a radio base station in a radio communications network, the method comprising:
receiving an indication whether the user equipment comprises a zooming quantization function from the user equipment; and
signaling to the radio base station within the radio communications network an indication whether the user equipment comprises a zooming quantization function.

12. The method of claim 11, wherein the zooming quantization function is arranged to determine a transmission power step to be added or subtracted to a current transmission power of the user equipment, which transmission power step is determined based on a received power control command and a previously received power control command from the radio base station.

13. A radio base station for controlling transmission power of a user equipment transmitting data to the radio base station in a radio communications network, the radio base station comprising:
a retrieving circuit configured to retrieve a target signal-to-interference ratio value;
a measuring circuit configured to measure a signal-to-interference ratio value of a received signal transmitted from the user equipment;
a determining circuit configured to determine whether the user equipment comprises a zooming quantization function;
a computing circuit configured to compute a power control command based on the measured signal-to-interference ratio value, the retrieved target signal-to-interference ratio value and whether the user equipment comprises a zooming quantization function, which power control command indicates a power control adjustment step of the user equipment; and
a transmitting circuit configured to transmit the power control command to the user equipment.

14. A user equipment for enabling control of a transmission power of the user equipment transmitting data to a radio base station in a radio communications network, the user equipment comprising:
a transmitting circuit configured to transmit a signal to the radio base station with a current transmission power; and
a signaling circuit configured to signal to the radio base station or a controller node within the radio communications network an indication of whether the user equipment comprises a zooming quantization function for handling power control commands received at the user equipment from the radio communications network.

15. A controller node for enabling control of a transmission power of a user equipment transmitting data to a radio base station in a radio communications network, the controller node comprising:
a receiving circuit configured to receive an indication whether the user equipment comprises a zooming quantization function from the user equipment; and
a signaling circuit configured to signal to the radio base station within the radio communications network an indication whether the user equipment comprises a zooming quantization function.

\* \* \* \* \*

UNITED STATES PATENT AND TRADEMARK OFFICE
CERTIFICATE OF CORRECTION

PATENT NO. : 9,094,920 B2  
APPLICATION NO. : 13/816262  
DATED : July 28, 2015  
INVENTOR(S) : Cea et al.

Page 1 of 1

It is certified that error appears in the above-identified patent and that said Letters Patent is hereby corrected as shown below:

In The Specification

In Column 7, Lines 7-8, in Equation (1), delete " $u_{ZQ}(k+d) = \text{sign}(u(k)) \cdot u_{ZQ}(k+d-1) \cdot b^{sign(u(k-1)sign(u(k)))} u(0, \ldots, d-1) = 1$ " and insert -- $u_{ZQ}(k+d) = sign(u(k)) \cdot u_{ZQ}(k+d-1) \cdot b^{sign(u(k-1) \cdot sign(u(k)))}$  
$u(0, \ldots, d-1) = 1$ --, therefor.

In Column 11, Line 65, delete "at lease" and insert -- at least --, therefor.

Signed and Sealed this  
Fifteenth Day of March, 2016

Michelle K. Lee  
*Director of the United States Patent and Trademark Office*